(12) United States Patent
Hosoe et al.

(10) Patent No.: US 7,033,255 B2
(45) Date of Patent: Apr. 25, 2006

(54) CHAMFER PROCESSING METHOD AND DEVICE FOR PLATE MATERIAL

(75) Inventors: Kazuyuki Hosoe, Aichi (JP); Takefumi Suzuki, Shizuoka (JP)

(73) Assignee: Jatco LTD, (JP)

( * ) Notice: Subject to any disclaimer, the term of this patent is extended or adjusted under 35 U.S.C. 154(b) by 0 days.

(21) Appl. No.: 10/446,118

(22) Filed: May 28, 2003

(65) Prior Publication Data
US 2004/0005846 A1    Jan. 8, 2004

(30) Foreign Application Priority Data
May 30, 2002  (JP)  .............................. 2002-157738

(51) Int. Cl.
B24B 1/00    (2006.01)
(52) U.S. Cl. .......................... 451/59; 451/302
(58) Field of Classification Search .................. 451/41, 451/59, 302, 307
See application file for complete search history.

(56) References Cited

U.S. PATENT DOCUMENTS 2,637,951 A * 5/1953 White ........................ 451/302
2,860,459 A * 11/1958 Presmyk ..................... 451/371
4,257,195 A * 3/1981 Appelgren .................. 451/276
4,281,483 A   8/1981 Horowitz et al.
5,429,544 A * 7/1995 Hasegawa et al. .......... 451/226
6,129,615 A * 10/2000 Corman ..................... 451/296

FOREIGN PATENT DOCUMENTS

| EP | 0 110 263 | 6/1984 |
| JP | 59019663  | 2/1984 |
| JP | 61152362  | 7/1986 |
| JP | 07-328829 | 12/1995 |
| JP | 07-328830 | 12/1995 |
| JP | 11-077499 | 3/1999 |

* cited by examiner

Primary Examiner—M. Rachuba
(74) Attorney, Agent, or Firm—Blank Rome LLP

(57) ABSTRACT

Chamfer processing is carried out by making plate material W end faces come in contact with rotating grinding belts. The grinding surfaces of the opposing side by side grinding belts are on the centerline in the thickness direction of the plate material. The center point is considered the pivot point as seen from the plate material end faces and in distance is smaller than the thickness of the plate material. Pivot motion of the plate material is carried out in the rotating direction of grinding belts. This chamfer processing method and device enables chamfer in a small curvature radius without applying a heavy tension load on grinding belts, and performs uniform deep chamfer processing of multiple plate material simultaneously.

5 Claims, 10 Drawing Sheets

CHAMFER PROCESSING METHOD AND DEVICE FOR PLATE MATERIAL

BACKGROUND OF THE INVENTION

This invention relates to a chamfer processing method and device, and more particularly to the R-chamfer (synonymous with bevel) process (hereinafter referred to only as chamfer for clarity) to mass-produce specialized components such as the end faces of small metal plate-like parts (hereinafter referred to as plate material) with complicated shapes, including the traverse element for a drive belt for a Continuously Variable Transmission (CVT) (hereinafter only referred to as the traverse element).

Although barrel grinding (also known as barrel polishing) is used in many cases, the chamfer size is small. This type of chamfer is unsuitable for a deeper chamfer required to manufacture the traverse element. Accordingly, in considering the generally known technology to perform chamfer processing of the traverse element, the above-mentioned subject matter remains to be solved. The technology for this function has been previously proposed in Japanese laid-open (Kokai) patent application number (A) Heisei 2-146334 (1990) titled "DRIVING BELT, ELEMENT FOR DRIVING BELT, AND MANUFACTURE THEREOF," and Japanese laid-open (Kokai) patent application number (A) Heisei 11-77499 (1999) titled "CHAMFERING METHOD OF PLATE MATERIAL, AND CHAMFERING DEVICE."

The aforementioned technology chamfers the plate material end faces by pivoting (i.e., rocking motion) the plate material while in contact with a grinding belt (also called an abrasive belt). Because of the large pivot radius of the plate material in contact with the grinding belt, only a large curvature radius can be carried out. On the other hand, the traverse element has a specialized shape. The inside slot which forms the neck of the traverse element becomes narrow, which makes deep chamfer processing difficult to accomplish.

In the above-mentioned chamfer method in order to perform a deep chamfer, the grinding belt tension is tightened. Moreover, this method employs variable belt tensions to control the fluctuation in the amount of chamfer processing. As a result, the heavier load on the grinding belt shortens its longevity and wears the belt out quickly. These factors make the equipment more complex to operate, as well as increase running and equipment costs.

SUMMARY OF THE INVENTION

The present invention has been made for the purpose of solving the circumstances mentioned above. Accordingly, although the present invention uses grinding belts, this chamfer processing method and device enables chamfer in a small curvature radius without applying a heavy tension load on the grinding belts, and performs uniform deep chamfer processing of multiple plate material simultaneously.

To solve the aforementioned subject and to achieve this end, chamfer processing is carried out by making plate material end faces come in contact with rotating grinding belts. The grinding surfaces of the opposing side by side grinding belts are on the centerline in the thickness direction of the plate material. The center point is considered the pivot point as seen from the plate material end faces and in distance is smaller than the thickness of the plate material. Pivot motion of the plate material is carried out in the rotating direction of the grinding belts. More specifically, chamfer processing is carried out in a virtually orthogonal array (right angled crosses) with the surfaces of multiple plate material end faces in the rotating direction of the opposed grinding belts. The chamfer processing of each plate material is carried out by making the end faces come in contact with the rotating grinding belts. Processing is further characterized by a pivot motion radius length that is within the overall length of the plate material and carried out on the centerline of each plate material.

The present invention method in the above-described composition is carried out on the end faces of each plate material while in contact with equal pressure grinding belts. The plate material pivot forward and backward in the rotating direction of the grinding belts in multiple plate material holders. In this regard, each plate material holder synchronously pivots in the same radius. Thus, uniform chamfer processing and large curvature plate material end faces can be accomplished.

Moreover, by the above-mentioned method, the difference of the pivot in the same forward direction as the rotating direction of the grinding belts is applied to the pivot in the backward direction as the rotating direction of the grinding belts. By enlargement of the pivot angle forward direction, the preferred balance in the amount of chamfer formed before and after the plate material end faces can be regulated.

In addition, in relation to the pivot of each of the above-mentioned plate material holders, the upper surface of the holder guide supports from beneath each correlated plate material holder, and forms the pivot radius in the concave circular arc. This circular arc also supports the back and forth sliding of each plate material holder along its circular arc.

To implement the above-mentioned chamfer processing method in the above-described composition is characterized by grinding belts arranged in a mode to be rotated by a driver pulley and follower pulley. A plurality of holder guides is arranged facing the grinding belts along the rotating direction of these belts. The upper surface of the holder guides is formed in a concave circular arc, which serves as the radius for the pivot motion of the work holders. A plurality of work holders carry out the pivot motion along the circular arc arranged in the upper sliding surface of each holder guide. Multiple work holders retain each correlated plate material and face the plane of each plate material to carry out the chamfer processing in an orthogonal direction with the rotating grinding belts. An interlocking linkage mechanism synchronizes the pivot motion of each work holder carried out on each holder guide. This linkage mechanism is equipped with a source drive for the reciprocating motion. The grinding surface of the rotating grinding belts is held against each work holder retaining each plate material in contact with the chamfer end faces and executed in combination with the pivot motion of each work holder.

The chamfer processing device of the present invention in the above-mentioned composition is further comprised of the belt guides installed along the sides of the free moving grinding belts for maintaining the straight rotation of these grinding belts. Additionally, in the adopted composition, a plurality of free moving belt regulators are installed above the butting part of each holder guide against the grinding belts. Furthermore, the grinding belts are composed of free movement to the work holders, as is the case with the belt guides and belt regulators. The purpose of assuming the free movement composition of the grinding belts, belt guides, and belt regulators is because of the set up of each work holder processing object by a multiple plate material loader and unloader, thus involving a bulk (batch set) loading and unloading process.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

The present invention will hereinafter be described in detail with reference to the preferred embodiments shown in the accompanying drawings.

Figure 1:
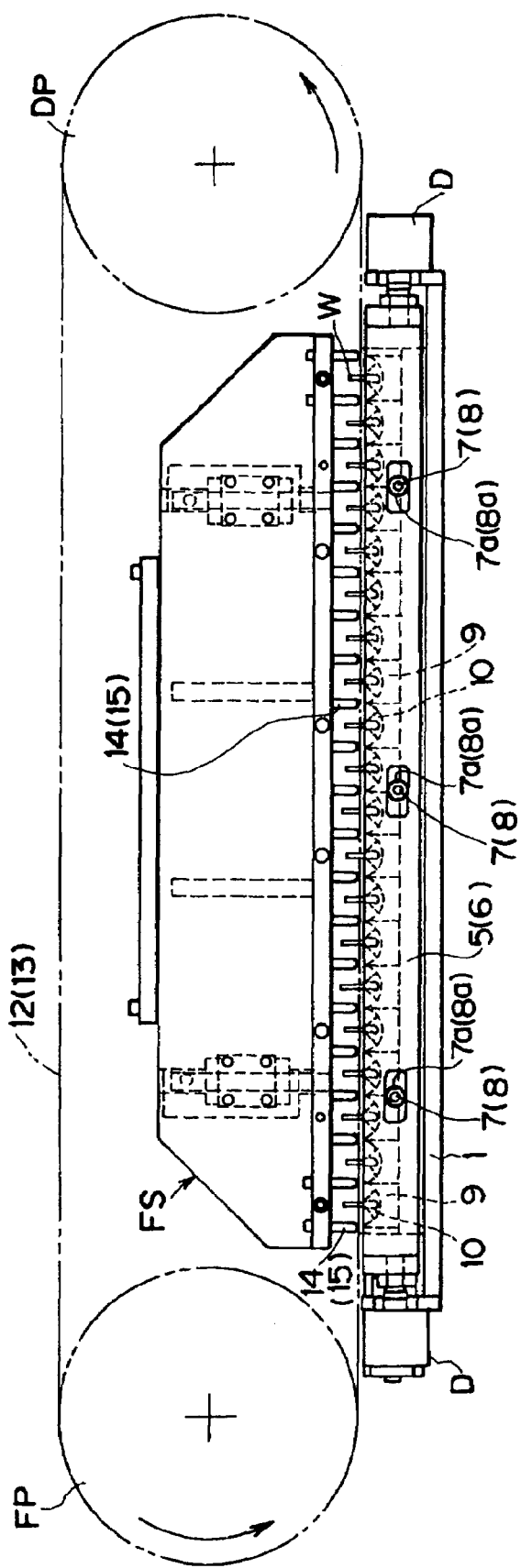
FIG. 1 is a front view of the entire chamfer processing device showing the primary components of the present invention.
Figure 2:
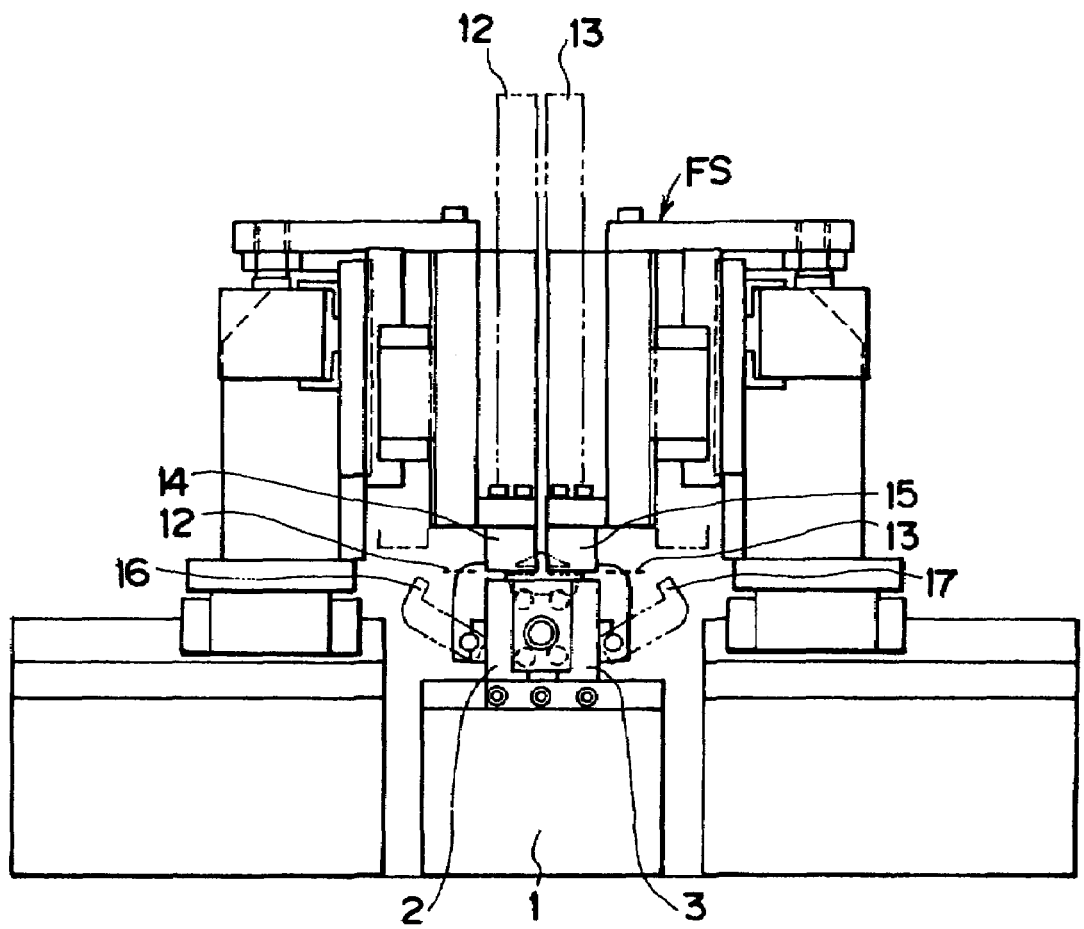
FIG. 2 is a right side view of the device in FIG. 1.
Figure 3:
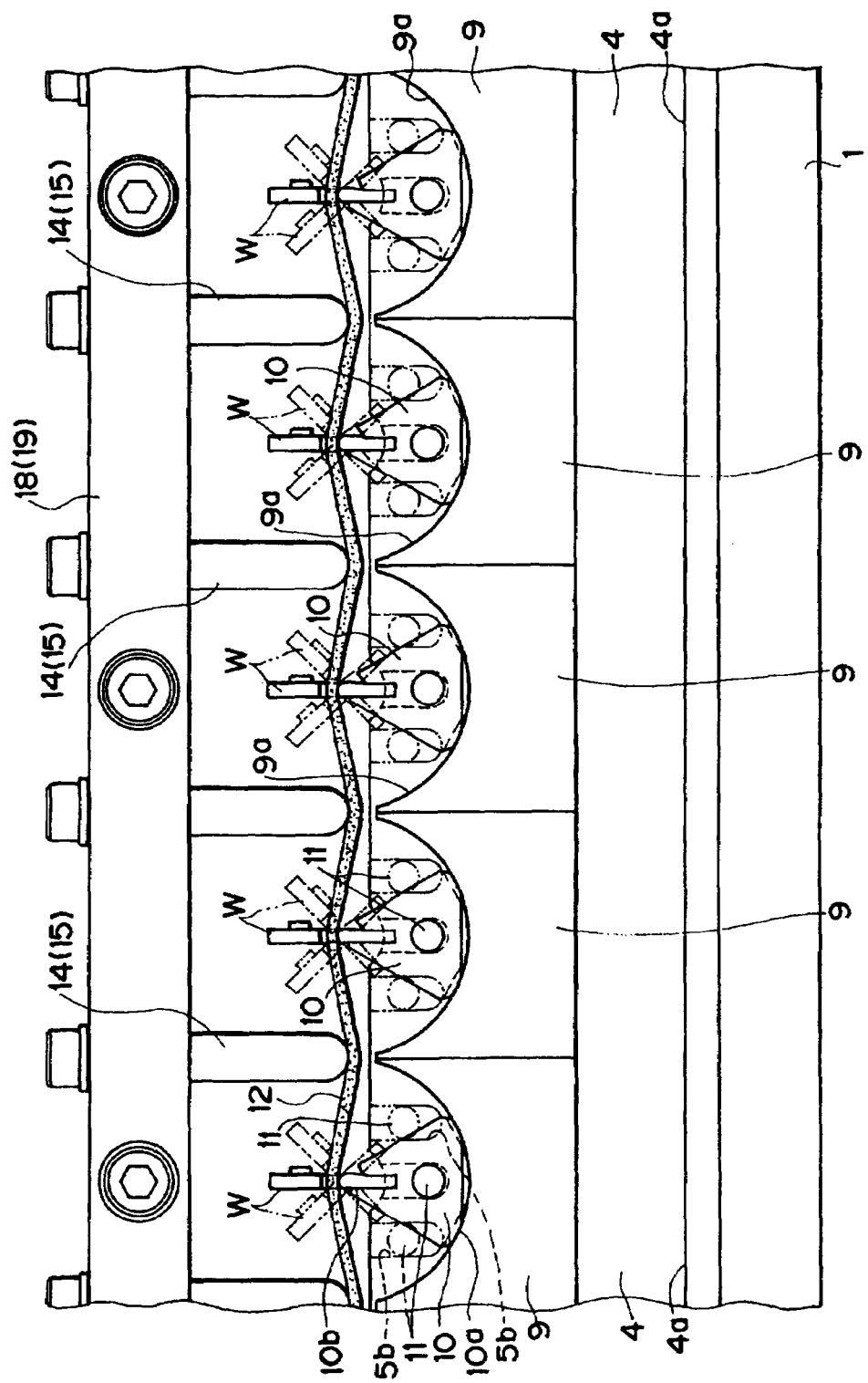
FIG. 3 is a front enlarged view showing the essential parts of the device illustrated in FIG. 1 and FIG. 2.

As illustrated in FIGS. 1 through 4, the base frame of the present invention is comprised of base 1 and work support plates 2 and 3. Work support plates 2 and 3 are mounted upright on the upper front and back surfaces of base 1 (FIG. 2 upper left and right sides). On opposite plane of the upper end and inner surface of work support plates 2 and 3, the tapered part of chamfer plate material W (hereinafter referred to as work W) comes in contact with taper parts 2a and 3a.

Figure 4:
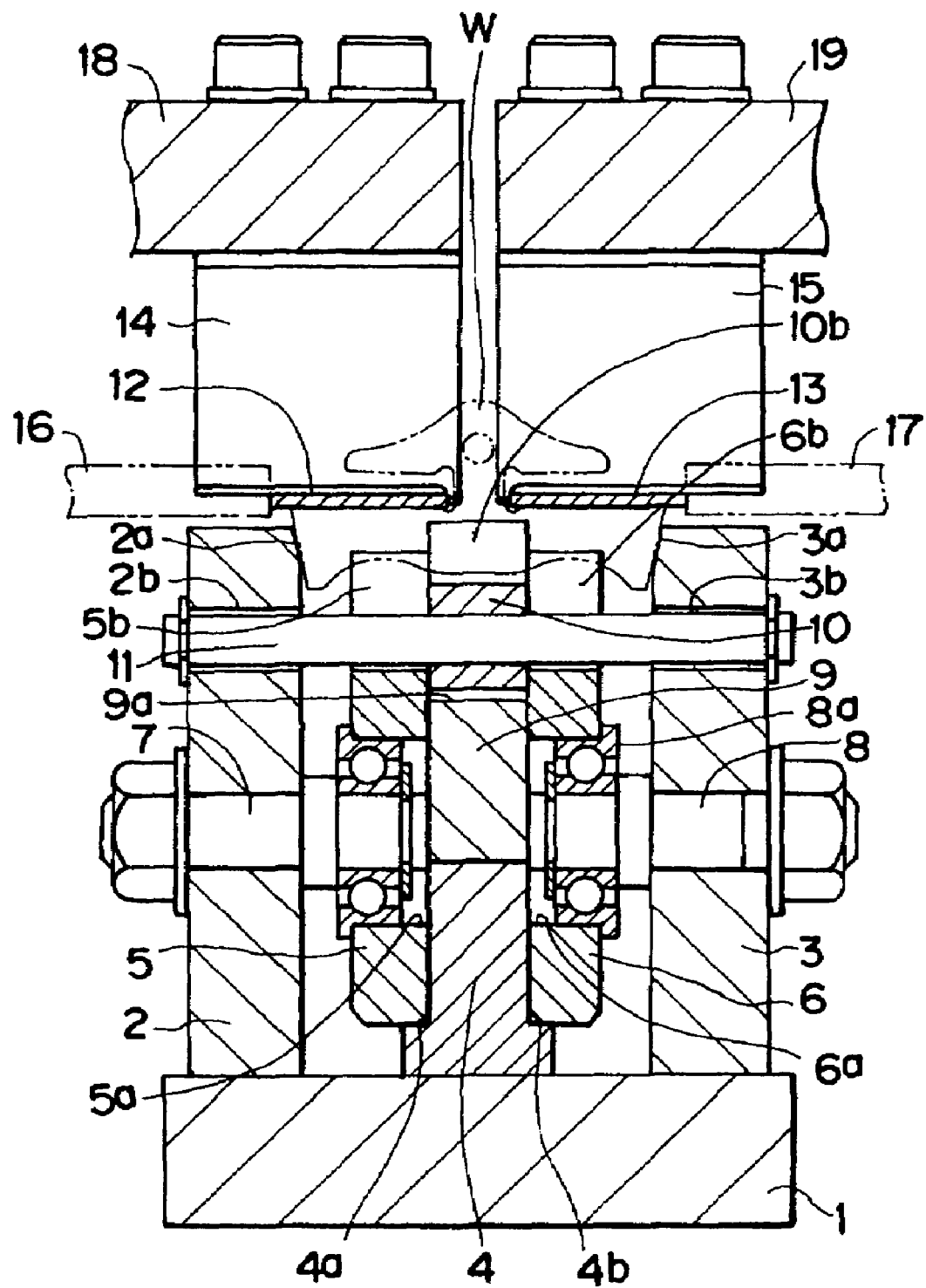
FIG. 4 is a cross-sectional view of the essential parts of the device illustrated in FIG. 1 and FIG. 2.

In the center section of base 1, guide stand 4 runs along its longitudinal length. As illustrated in FIG. 4 cross-sectional view, guide stand 4 is mounted in an upright position on top of base 1 in the shape of an abbreviated inverted T.

Inserted on both sides of guide stand 4, sliders 5 and 6 are arranged in position by shoulders 4a and 4b, respectively. Sliders 5 and 6, which are located along the lengthwise dimension of work support plates 2 and 3 in several places (FIG. 1 shows 3 places), are horizontally attached to support rods 7 and 8 by means of bearings 7a and 8a on the outer sides. Sliders 5 and 6, contain structure holes 5a and 6a, which slide freely in the lengthwise direction of base 1. In the upper surface of the above-mentioned sliders 5 and 6, U-shaped slots 5b and 6b enclose a loosely inserted pivot shaft 11 to be mentioned later. As shown in FIG. 1, slider drive source D is set up at both ends of sliders 5 and 6.

On the top surface of the above-mentioned guide stand 4, holder guide 9 is bridged between sliders 5 and 6. Holder guide 9 forms a block shaped rectangle which is not quite square. The upper surface of holder 9 forms a concave circular arc 9a which supports the pivot shaft motion of work holders 10 described later. Circular arc 9a is a concentric circle centered on the center of the R-chamfer where chamfer processing of work W is carried out in work holders 10.

Work holders 10 are defined as a block shape (FIG. 4) yet when observed from the front view roughly resembles a triangle. For clarity purposes, in the concept of the present invention, work holders 10 in context are synonymous with plate material holders which contain work W. For example, work holders 10 are realized as the plate material holders; however, the actual instance of work holders 10 is not limited to plate material holders. Work holders 10 may be realized in other holders. In this invention, work holders 10 serves as the best example. When evenly positioned at the base side, work holders 10 on the side of sliding surface 10a slides through circular arc 9a of holder guide 9. Support slot 10b maintains work W in the top part. Furthermore, there is a plurality of holder guide 9. As shown in FIG. 1 example, twenty work W are arranged in a row on the upper surface of guide stand 4 with a separate holder guide 9 for every work holder 10.

Each work holder 10 is constructed with a centrally-located pivot motion axis (hereinafter referred to as pivot shaft 11) passed through U-shaped slots 5b and 6b in sliders 5 and 6, as well as supported by structure holes 2b and 3b in work support plates 2 and 3, respectively. The aforementioned sliders 5 and 6 containing U-shaped slots 5b and 6b, holder guide 9 and pivot shaft 11 constitute the pivot motion in the interlocking linkage mechanism of work holders 10.

The function of the above-mentioned interlocking linkage mechanism will be described below. If sliders 5 and 6 move horizontally, pivot shaft 11 situated between U-shaped slots 5b and 6b will also move simultaneously. Pivot shaft 11 is supported by work support plates 2 and 3 in structure holes 2b and 3b. Structure holes 2b and 3b are circular holes centered on the center pivot point. For this reason, pivot shaft 11 is guided by these circular structure holes and the pivot motion is carried out according to the movement of sliders 5 and 6.

On the opposite side above work support plates 2 and 3 and work holders 10, the grinding process is carried out on each work W set in each work holder 10. Here, the alignment of two grinding belts 12 and 13 are regulated by belt regulators 14 and 15 which press down from above. Also, belt guides 16 and 17 support and lead the grinding belts 12 and 13 from the outside of each installed position. Here, as illustrated in FIG. 1, twenty-one belt regulators 14 and 15 are situated in a row above the butting part of each holder guide 9. In addition, each of the belt regulators 14 and 15 are set up in each of the respective installation frames 18 and 19 as part of the frame support mechanism FS equipped with side blocks, cylinders, etc. In relation to work holders 10, the frame support mechanism FS moves freely in the up and down—back and forth directions (FIG. 2 left and right). Also, as shown in FIG. 1, driver pulley DP and follower pulley FP surround the above-mentioned grinding belts 12 and 13.

As illustrated in FIG. 2 example, the tip sides of above-mentioned belt guides 16 and 17, form freely in proximity to the outer side of each the grinding belts 12 and 13. The axial stop for belt guides 16 and 17 is limited by work support plates 2 and 3. While centered on the axis and standing upright, belt guides 16 and 17 are installed to freely tilt/incline as necessary.

Figure 6:
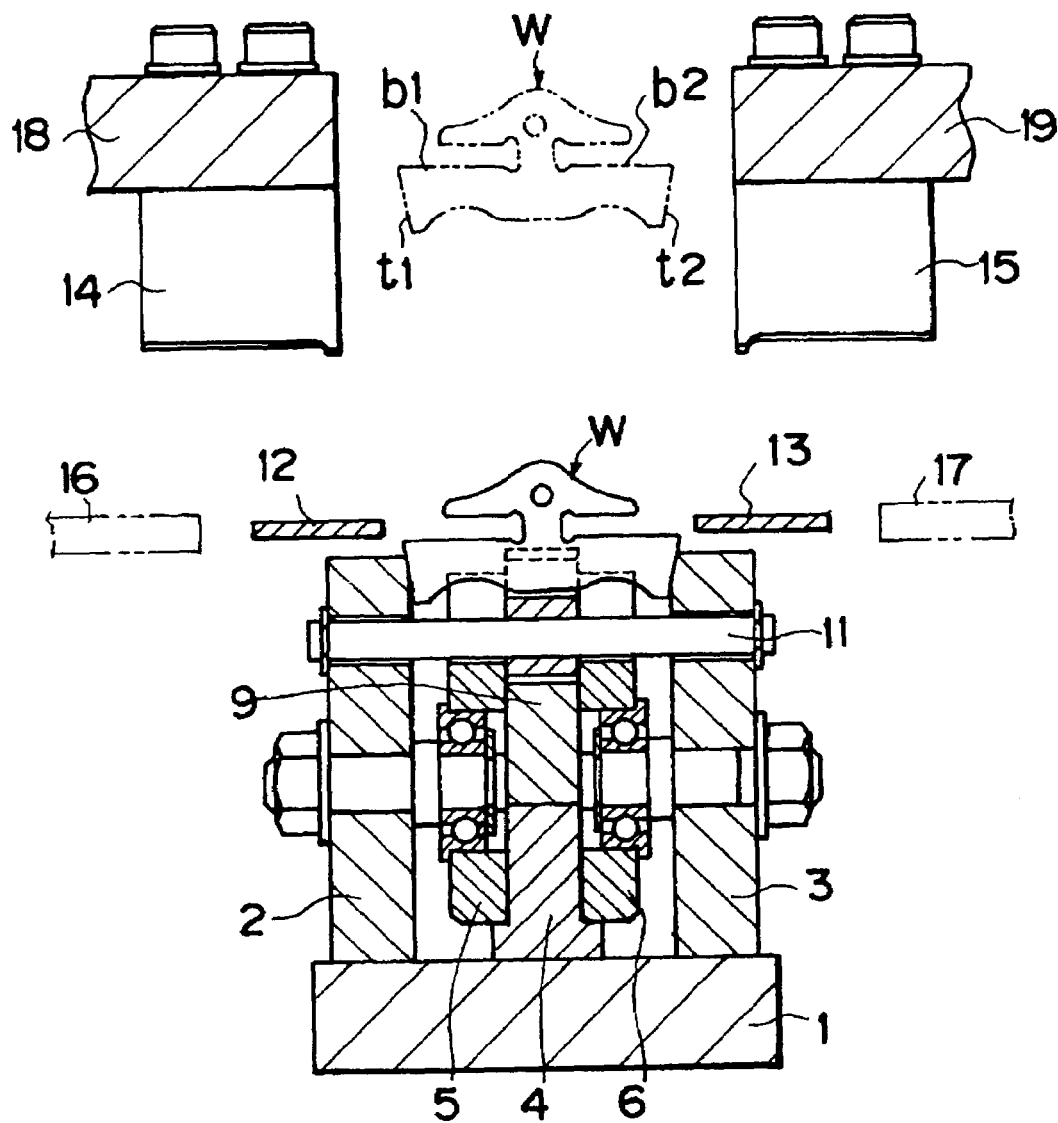
FIG. 6 is a sectional side elevation view of the condition in FIG. 5.

Here, the chamfer processing of work W plate material, which uses the practical example of a traverse element for a drive belt for a CVT, will be described below. Work W in this case of operation, as in FIG. 6, consists of chamfer processing the upper end faces of steel band acceptance slots b1 and b2 located above torque transfer planes t1 and t2.

Figure 5:
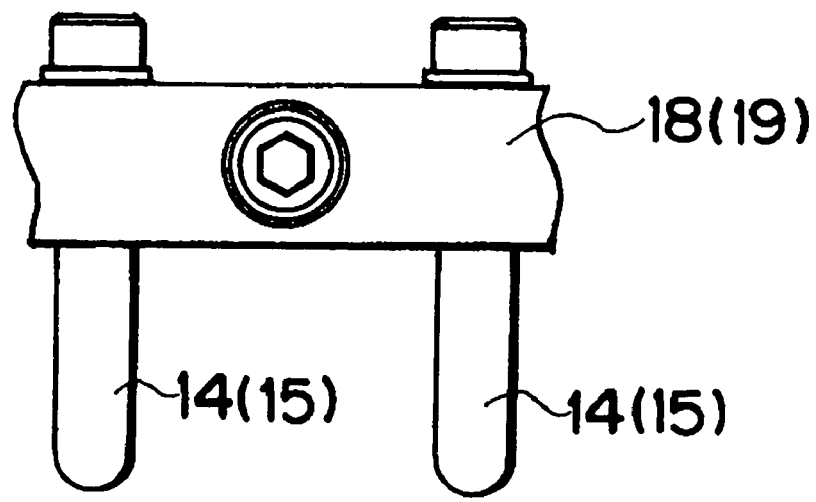
FIG. 5 is a front view for explaining the set condition of the plate material according to the present invention.
Figure 5:
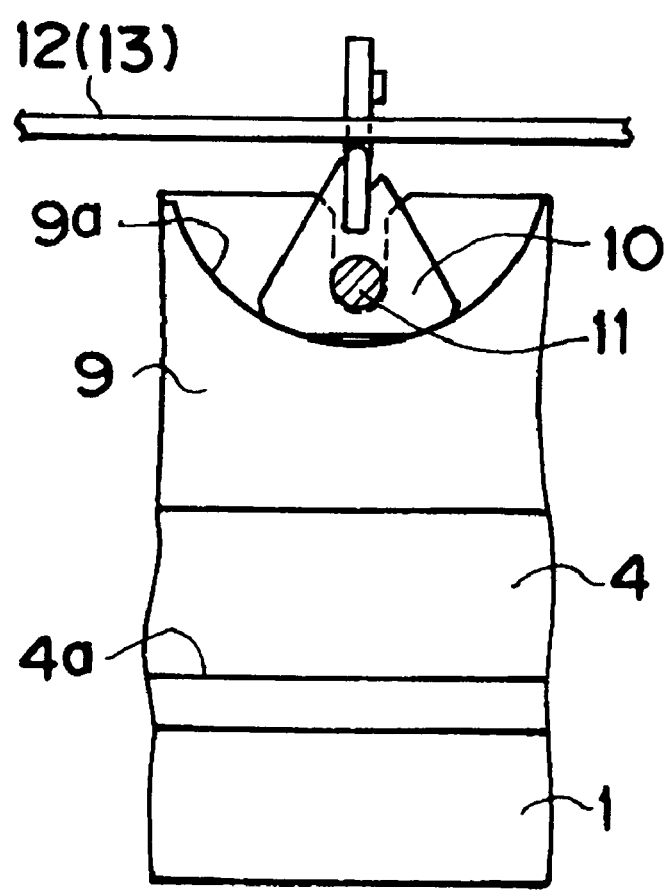

Each work W batch set is placed into each work holder 10 with a loader (not shown). During the time of this set up, each work holder 10 is in the upright position as in FIG. 5. In other words, in a non-pivoting condition, grinding belts 12 and 13 comprised of driver pulley DP and follower pulley FP, belt regulators 14 and 15 comprised of frame support mechanism FS and belt guides 16 and 17 shunt (shift) in position so as to not to become an obstruction with the loader of work W (refer to FIG. 6).

Figure 7:
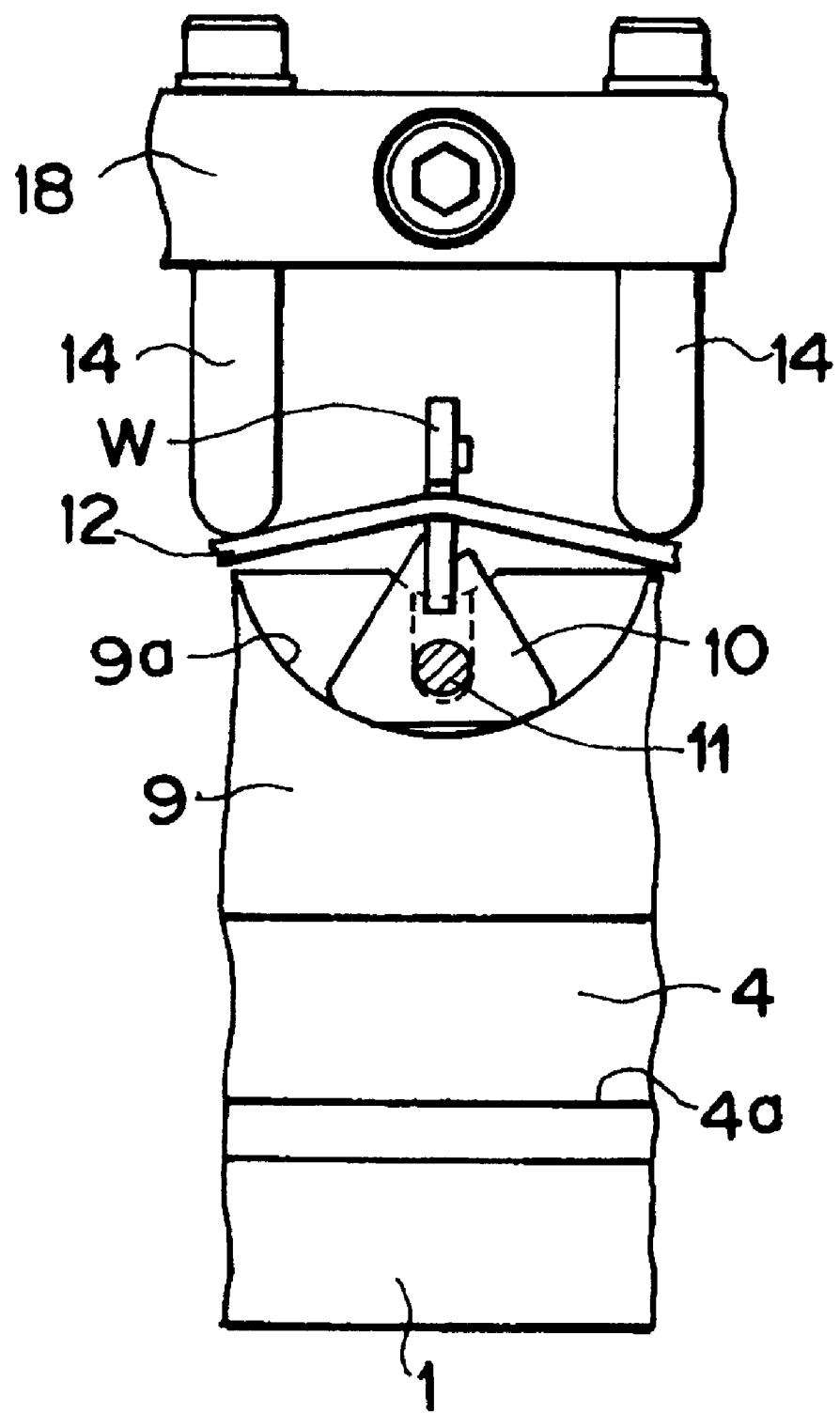
FIG. 7 is front view of the plate material set with the belt hold down in a lowered condition.
Figure 8:
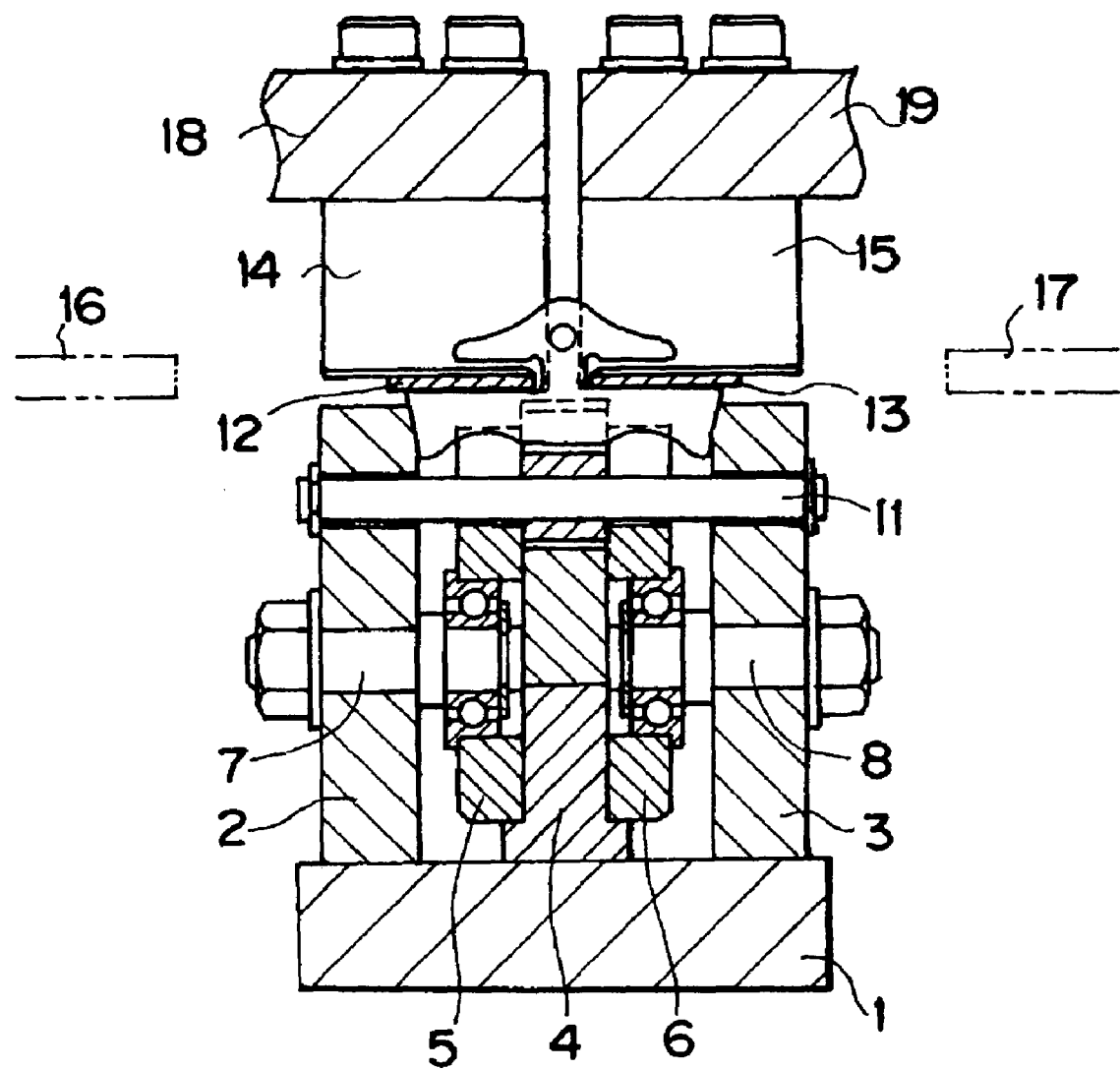
FIG. 8 is a sectional side elevation view of the condition of FIG. 7.
Figure 9:
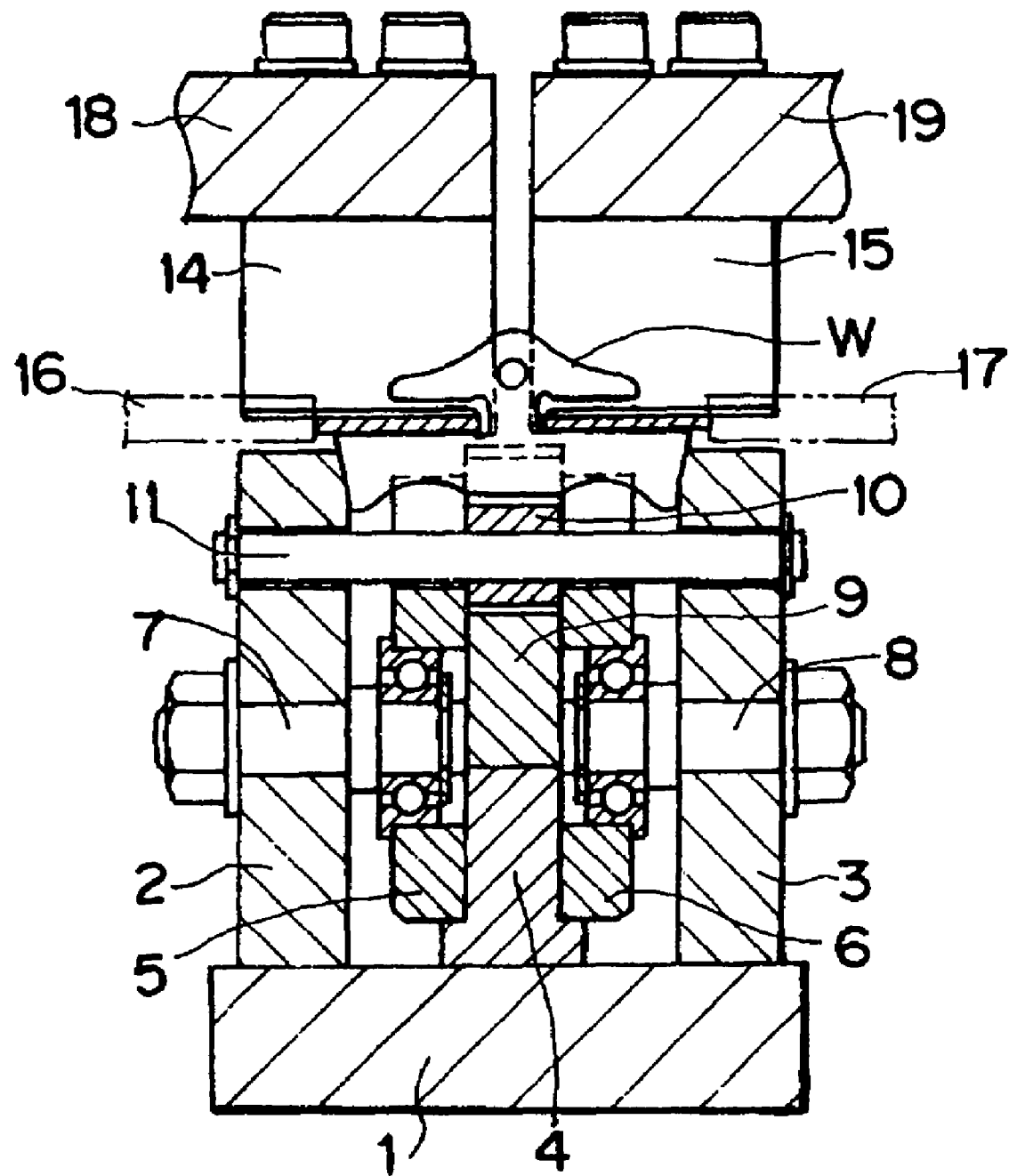
FIG. 9 is a sectional side view of the belt guide set condition from the FIG. 8 condition.
Figure 10:
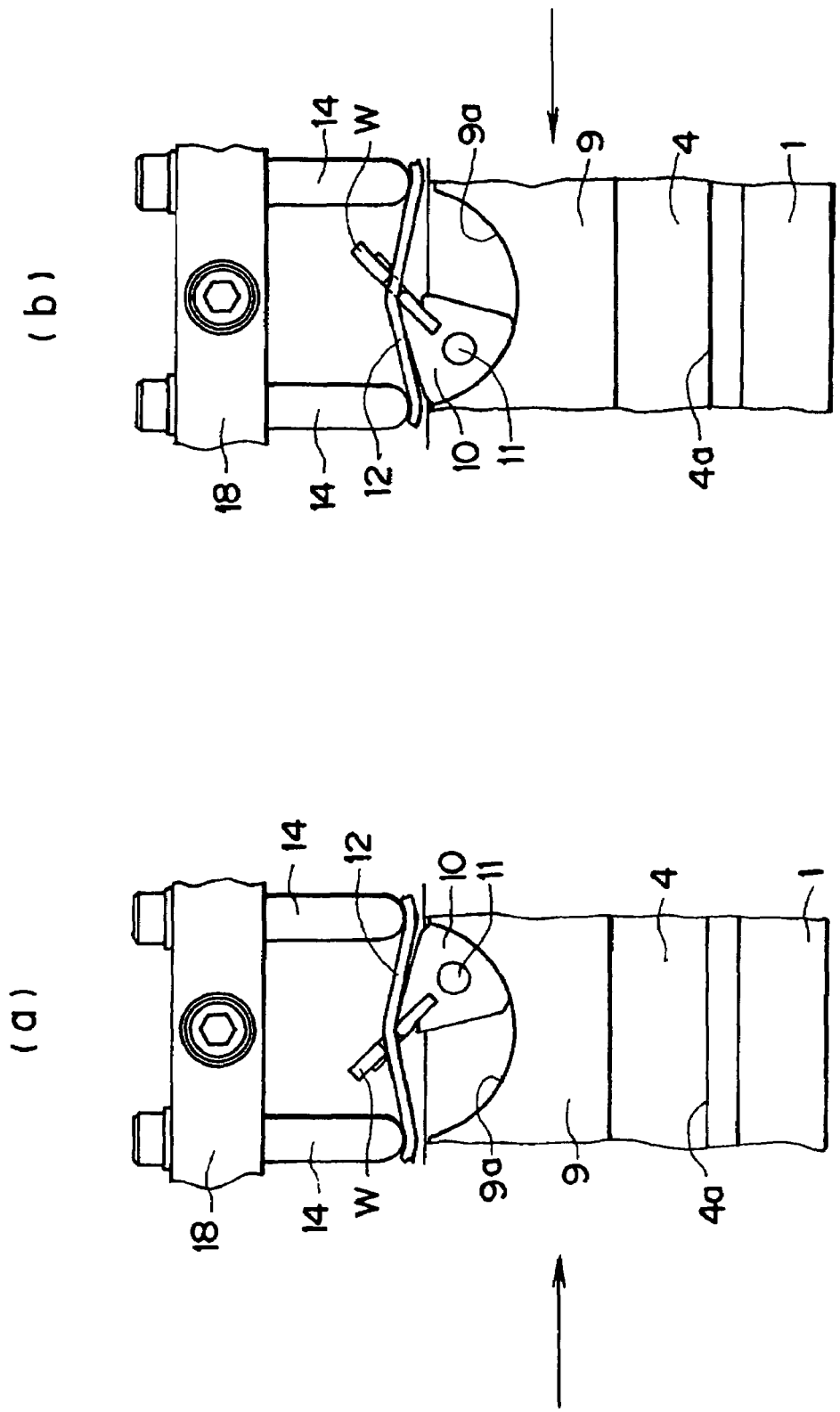
FIGS. 10(a) and 10(b) are front views for explaining the related pivot conditions of each work holder: (a) front view of left-leaning plate material, and (b) front view of right-leaning plate material

When a batch set of work W is to be completed, shunted grinding belts 12 and 13, belt regulators 14 and 15, and belt guides 16 and 17 return to a predetermined position and will be in a chamfer grinding process standby condition (refer to FIGS. 7–9). Here grinding belts 12 and 13, by the action of the belt regulators 14 and 15, make a slight inverted-V (from the horizontal plane about 1–3 millimeters in height) at the peak where work W comes in contact.

In this condition, sliders 5 and 6 are driven by drive source D and the reciprocating motion is carried out by sliders 5 and 6 alternating in the left and right directions as shown in FIG. 1. The amount of reciprocation strokes can be freely adjusted as the pivot angle is reflected in work holders 10. However, work holders 10 can only be adjusted within the range that does not deviate from the concave circular arc 9a of holder guide 9. Furthermore, similar to the amount of the strokes, adjustment of the stroke speed and pivot edge stop time is also possible. As the above-mentioned sliders 5 and 6 perform the reciprocating motion, pivot shaft 11 of each work holder 10, supported by U-shaped slots 5b and 6b, pivot along the concave circular arc formed in the upper surface of each holder guide 9. According to the reciprocating motion in slots 5b and 6b (pivot angle maximum ±45 degrees), the upper end faces of belt acceptance slots b1 and b2 in each work W is accomplished by the rotating grinding belts 12 and 13 to complete the type R-chamfer processing.

Moreover, in a situation whereby press processing of work (plate material) is carried out, a "burr" can occur on one side of the end face and a "sag" (shear droop) on the opposite side. If chamfer processing work is carried out under these conditions using the same pivot angle, the amount of chamfer may differ. Accordingly, the chamfer processing pivot angle can be adjusted and set at different angles left and right.

When the predetermined number of pivot times is completed, the rotating grinding belts 12 and 13 are shut down. Grinding belts 12 and 13, belt regulators 14 and 15, and belt guides 16 and 17 are returned to the initial work set condition. Work W which is finished processing is removed from work holder 10 by an unloader (not shown) and carried out to a predetermined place.

As set forth above, chamfer processing is carried out in a virtually orthogonal array (right angled crosses) with the surface of multiple plate material end faces in the rotating direction of the opposed grinding belts. The chamfer processing of each plate material is carried out by making the end faces come in contact with the rotating grinding belts. Processing is further characterized by a pivot motion radius length that is within the overall length of the plate material and carried out on the centerline of each plate material.

Since simultaneous chamfer processing of multiple plate material can be accomplished, the advantages and achievable effects of the present invention are as follows:

1. Respectively multiple plate material are supported in plate material holders, which move in a small radius pivot motion in contact with rotating grinding belts. In addition, as the chamfering is accomplished by grinding the end faces to be chamfered with the grinding belts, deep chamfer processing of a narrow area can be performed. (For example, deep chamfer processing of the inside slot shape is feasible.)

2. For the same reason as item 1 above, a larger R-chamfer (about R0.5) shape than an R-chamfer shaped by barrel grinding is obtainable.

3. The present invention chamfer processing device can perform loading and unloading of plate material both automatically and mechanically. Therefore, by linking the order (production) process with this processing device, automation of sequential processes becomes possible, such as press processing of small plate material, grinding and assembly.

4. R-chamfer processing covering the entire plate thickness is possible. Each plate material is shaped by the pivot motion of the plate material holders during the rotation of the grinding belts which are depressed by the belt regulators.

5. This is a concise chamfer mechanism, whereby each plate material holder and each holder guide support each plate material holder, and the rotating grinding belts are depressed by belt regulators. In addition, as variation in the amount of processing of each end face does not occur, precise processing can be performed.

6. Even if the plate material is asymmetry, processing can be carried out on left-and-right end faces simultaneously. This is the case as chamfer processing is carried out on the surface of each plate material end face arranged in an orthogonal direction in the rotating direction of two grinding belts.

7. With the present invention chamfer processing device even if only chamfer processing one side of the plate material, by exchanging a work regulator belt that operates in the same manner with the grinding belt on the unprocessed side, single-sided processing becomes possible.

8. By changing the pivot angle of the plate material holder or the pitch between the belt regulators, R-chamfer cross-sectional shape and chamfer position can easily be altered.

9. The plate material holder can be brought to a temporary stop (paused) at the pivot edge. If the plate material is processed in this condition with the grinding belts rotating, corner chamfer (flat chamfer) processing is achievable.

10. Even if you apply high tension to the grinding belts, the pivot motion of the plate material holders and the rotating grinding belts work in a collaboration operation to carry out the grinding; thereby reducing the belt load.

11. By enlarging the pivot angle of the plate material holder, deep R-chamfer shaped end face sides can be accomplished.

12. As there are a large number of plate material holders arranged in a row in the chamfer device area, simultaneous chamfer processing of multiple plate material can be carried out. As a result, plate material scheduling (setup/removal) loads are reduced and productivity is enhanced.

13. Even when chamfer plate material end faces have uneven shapes in the width direction of the grinding belts, the belt regulator surfaces adapt to level the uneven shapes. Consequently, chamfer processing of irregularly shaped plate material can be performed.

While the present invention has been described with reference to the preferred embodiments thereof, the invention is not to be limited to the details given therein.

As this invention may be embodied in several forms without departing from the spirit of the essential characteristics thereof, the present embodiments are therefore illustrative and not restrictive, since the scope of the invention is defined by the appended claims rather than by the description preceding them, and all changes that fall within meets and bounds of the claims, or equivalence of such meets and bounds thereof are therefore intended to be embraced by the claims.

What is claimed is:

1. A chamfer processing method for plate material comprising the steps of:

arranging the plate material relative to rotary grinding belts, wherein end faces of plate material which are used for carrying out chamfer processing are contacted with rotating grinding belts; wherein a plurality of said plate material is held by a plurality of plate material holders that pivot in a rotating direction of said grinding belts and said plate material of said chamfer processing method grinds end faces of said plate material; and making said plate material holder pivot along a proper surface of a holder guide which forms a concave circular arc surface which makes a pivot radius of said plate material holder.

2. The chamfer processing method for plate material of claim 1, wherein chamfer processing is carried out on the end faces of each plate material while in contact with equal pressure grinding belts; said plate material pivot forward and backward in the rotating direction of the grinding belts in multiple plate holders.

3. The chamfer processing method for plate material of claim 1, wherein said plurality of plate material holders synchronously pivots in the same radius.

4. The chamfer processing method for plate material of claim 1, wherein the difference of the pivot in the same forward direction as the rotating direction of said grinding belts is applied to the pivot in the backward direction as the rotating direction of said grinding belts.

5. A chamfer processing method for plate material comprising the steps of:

placing an end face of said plate material to receive chamfer processing in contact with a traveling grinding belt, wherein a plate material holder holding said plate material pivots along a rotating direction of said grinding belt and said end face of said plate material is ground; and pivoting said plate material holder along a surface of a holder guide formed by a concave arc surface to establish a pivot radius of said plate material holder surface.

* * * * *